United States Patent
Tschirren et al.

(10) Patent No.: US 7,034,278 B2
(45) Date of Patent: Apr. 25, 2006

(54) DEVICE FOR DETECTING MOVEMENTS OF AN OBJECT SURFACE HAVING A PRISM FOR UNIFORMLY DISTRIBUTION OF LIGHT

(75) Inventors: Pierre Tschirren, Marin (CH); Gilles Mathieu, Montpellier (FR); Christophe Dufresne, Guyans-Vennes (FR); Giovanni Longa, Le Landeron (CH)

(73) Assignee: EM Microelectric - Marin SA, Marin (CH)

( * ) Notice: Subject to any disclaimer, the term of this patent is extended or adjusted under 35 U.S.C. 154(b) by 111 days.

(21) Appl. No.: 10/478,657

(22) PCT Filed: Jun. 5, 2002

(86) PCT No.: PCT/EP02/06496

§ 371 (c)(1),
(2), (4) Date: Nov. 25, 2003

(87) PCT Pub. No.: WO03/003287

PCT Pub. Date: Jan. 9, 2003

(65) Prior Publication Data

US 2004/0149894 A1 Aug. 5, 2004

(30) Foreign Application Priority Data

Jun. 13, 2001 (EP) .................................. 01202268

(51) Int. Cl.
*H01J 40/14* (2006.01)

(52) U.S. Cl. ..................................... 250/221; 250/239
(58) Field of Classification Search ................ 250/221, 250/224, 239; 345/163, 165, 166
See application file for complete search history.

(56) References Cited

U.S. PATENT DOCUMENTS

| 4,794,384 | A | 12/1988 | Jackson |
| 5,686,720 | A | 11/1997 | Tullis |
| 6,124,587 | A | 9/2000 | Bidiville et al. |
| 6,342,670 | B1 * | 1/2002 | Lin et al. ..................... 250/239 |
| 6,462,330 | B1 * | 10/2002 | Venkat et al. ................ 250/239 |
| 6,741,234 | B1 * | 5/2004 | Son ............................. 345/166 |

FOREIGN PATENT DOCUMENTS

EP 942 285 9/1999

* cited by examiner

*Primary Examiner*—Que T. Le
(74) *Attorney, Agent, or Firm*—Sughrue Mion, PLLC

(57) ABSTRACT

A movement detection device, intended particularly for a computer mouse or a hand-held scanner, includes a light source (7) associated with a prism (8) having a non-uniformly plane reflective face. One thus obtains an as uniform as possible illumination of the field (4) of the object whose movements will be detected. An optical system (9) inserted between the field and the optoelectronic sensor (13) fixed to a printed circuit board (6) is mounted on a support (12) fixed to the board.

10 Claims, 3 Drawing Sheets

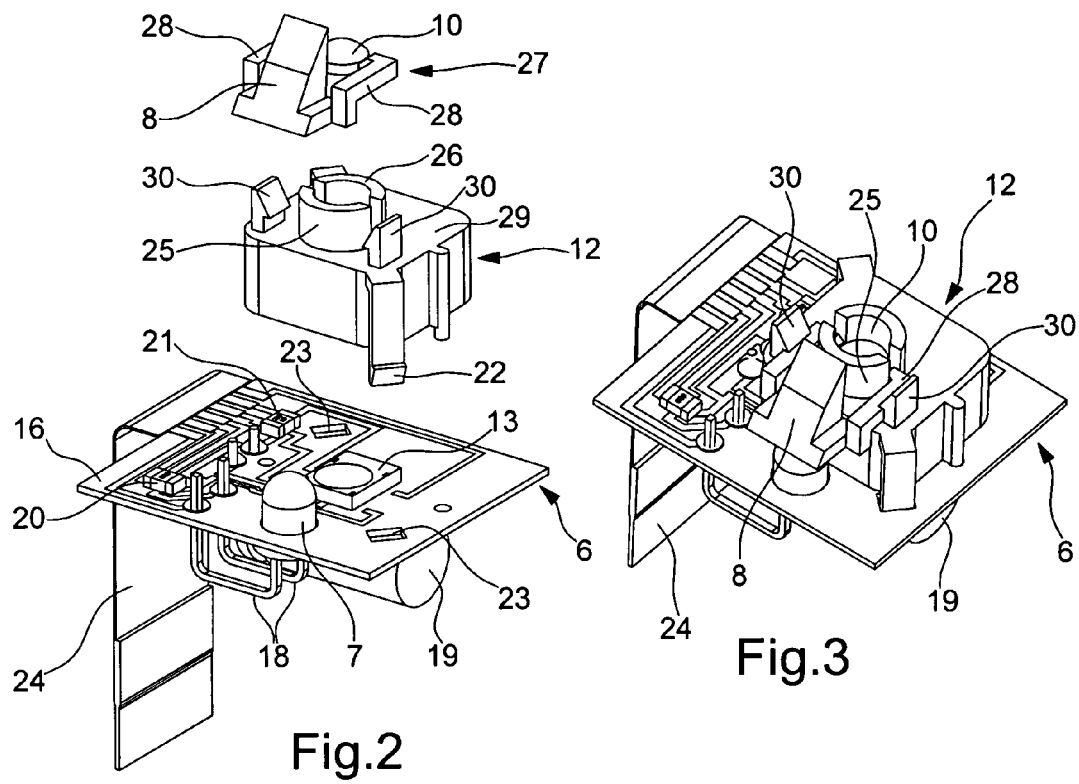
Fig.2
Fig.3
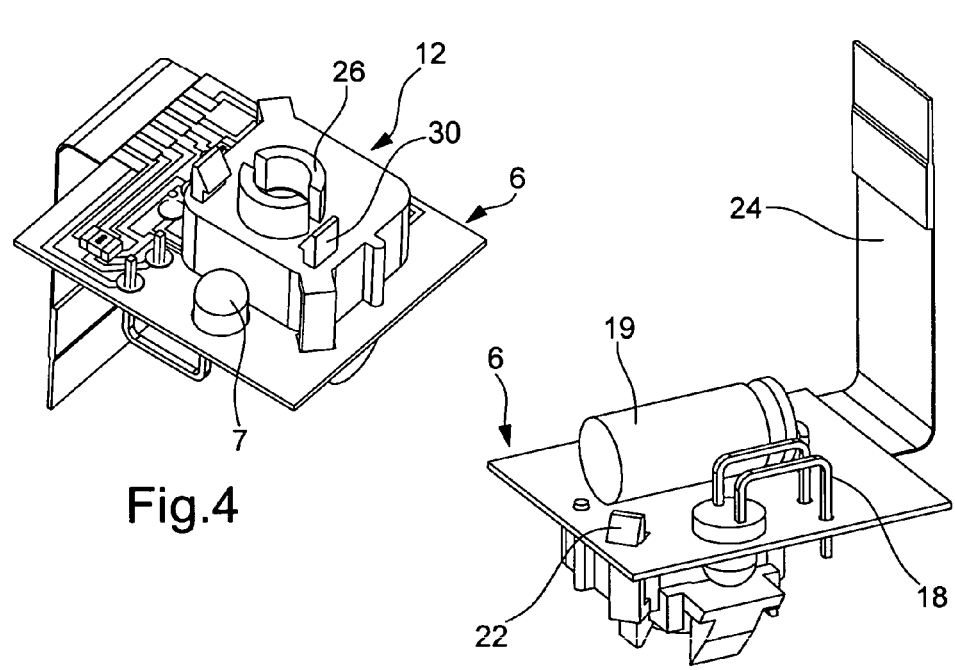
Fig.4
Fig.5

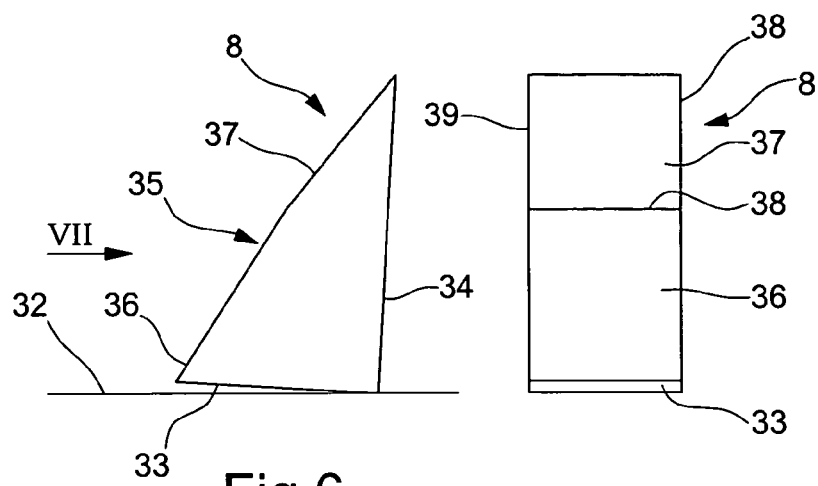
Fig.6  Fig.7
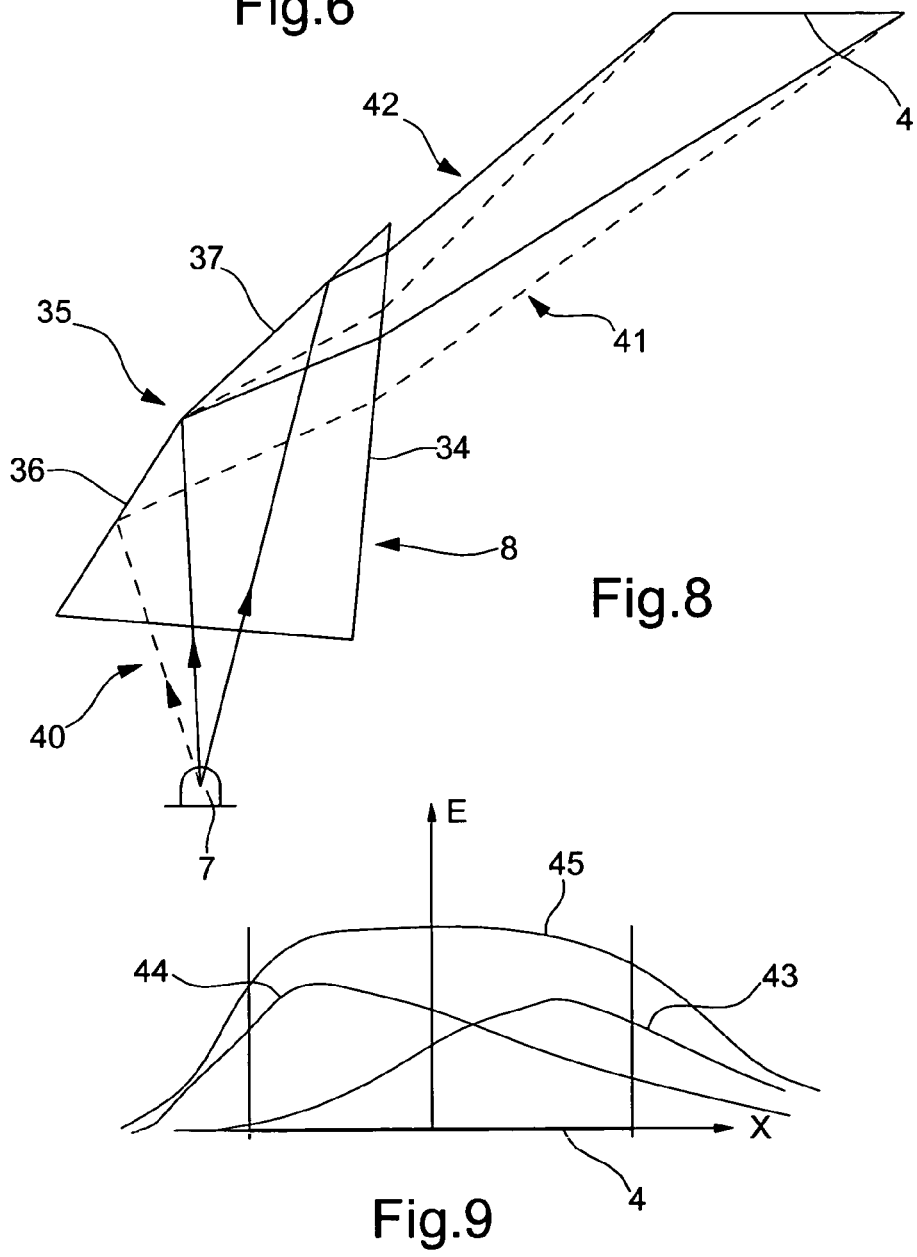
Fig.8
Fig.9

DEVICE FOR DETECTING MOVEMENTS OF AN OBJECT SURFACE HAVING A PRISM FOR UNIFORMLY DISTRIBUTION OF LIGHT

BACKGROUND OF THE INVENTION.

The present invention concerns a device for detecting movements of a surface of an object, particularly for a computer pointing tool, including a light source, guide means for directing light coming from said source obliquely over a field of said surface, an optoelectronic sensor provided with an array of photo-sensors, an optical system for forming an image of said field on the optoelectronic sensor.

U.S. Pat. No. 6,124,587 discloses a pointing device with a ball wherein the movements of the surface of the ball by rotation of the latter are detected by optical means, the surface being provided with a pattern formed of regular or irregular spots. A small portion of the surface of the ball, forming a field defined by a fixed window in which one wishes to detect the movements of the ball surface, is illuminated obliquely by means of two light emitting diodes (LED) mounted in a support on either side of a lens. The light reflected by the field thereby illuminated is reflected by a mirror associated with the lens towards an optoelectronic sensor including an array of photo-sensors. The signals originating from the sensor are processed by electronic circuits mounted on a printed circuit board, to provide data relating to the movement of the field along two components in its plane.

The construction illustrated in particular by FIGS. 7 to 12 of the aforementioned Patent, includes an optical housing in two parts used as a mounting piece for the LED's, the mirror, the lens and the optoelectronic sensor. The mirror is formed by a reflective surface on a plane face of the lens. The housing is secured by being snap fitted, on the one hand, onto the ball guide housing and on the other hand, onto the printed circuit board. The sensor and the LED's include metal connecting lugs to connect them electrically to the printed circuits of the board.

In an arrangement of this type, two light sources have to be used, at a distance from each other, in order to obtain sufficiently uniform illumination of the observed field, so that the detection of its movements can occur in proper conditions. The light originating from the LED's is led to this field by respective channels arranged in the optical housing. Consequently, the housing is relatively complicated and several groups of connecting lugs are necessary for connecting the LED's and the printed circuit board.

Another drawback of this construction lies in the cost of the mirror, the role of which is to obtain a bend path for the light from the observed field to the sensor, to prevent the latter from receiving stray light originating from elsewhere.

Other drawbacks are linked to the fact that the optical housing, assuring precise mutual positioning of all the components which it carries, constitutes a complicated part requiring an expensive mould for mass production. If one of the components, or its position, has to be modified, a new mould has to be made, involving significant costs. Moreover, this construction requires a step of making numerous electric connections to the printed circuit board after the optical housing has been mounted on the board, which complicates manufacturing.

U.S. Pat. No. 5,686,720 discloses a construction, which avoids certain of the aforementioned drawbacks. It is a so-called navigation sensor, incorporated in a hand-held scanner for measuring the movements of a scanner over a document. In the example illustrated by FIG. 5 of said patent, a small field of the document is illuminated by a light source through a prism placed just above it. The prism deviates the light beam so that the light reaches the paper at a small angle, typically less than 16°. The light diffused by the paper passes back through the prism and is collimated towards an array of photo-sensors by means of a convex surface of the prism, forming a lens. This enables the light source and the optoelectronic sensor with photo-sensors to be mounted directly on the printed circuit board. However, this arrangement does not allow the sensor to be efficiently protected against the stray light originating from the prism region.

SUMMARY OF THE INVENTION.

The present invention concerns a device capable of avoiding at least certain of the aforementioned drawbacks of the prior art, while still being able to assure efficient detection of the movements, reliable and precise positioning of the components and moderate manufacturing costs.

The invention therefore concerns a device of the type indicated in the preamble, characterised in that the guide means include a prism having a reflection face, on which the light coming from said source undergoes total reflection, said face having a non-uniformly plane shape arranged to concentrate the light towards the field to be observed on the surface of the object.

This arrangement has a double advantage. On the one hand, the prism creates a bend in the path of the light going from the source to the observed field, which enables the optical system and the optoelectronic sensor to be placed directly opposite the field, whereas the light source can be located beside the sensor and be fixed to the same printed circuit board. This results in a very compact construction of the assembly and simplifies the electric connections. On the other hand, a suitable configuration of the reflection face of the prism allows uniform distribution of the light over the field that has to be observed, without adding any additional optical element.

In a particularly simple and inexpensive embodiment, the reflection face of the prism includes two plane surfaces forming an angle between them. This enables the divergence of the beam originating from the light source to be overcome, by dividing the beam into two partial beams oriented towards the field to be observed, so as to obtain proper distribution of the illumination over it. At the same time, one can use a prism whose external surfaces are all plane, which simplifies the manufacture and positioning thereof. However, in other embodiments, the reflection face of the prism may be convex to form a concave reflector capable of assuring the illumination uniformity. It could also include a series of plane faces.

BRIEF DESCRIPTION OF THE DRAWINGS

Other features and advantages of the present invention will appear in the following description of a preferred embodiment, given by way of non-limiting example with reference to the annexed drawings, in which:

FIG. 2 is an exploded perspective view of a the main components of the device of FIG. 1;

FIG. 3 shows the subject of FIG. 2 in the assembled state;

FIG. 4 is a similar view to FIG. 3, from which an optical element has been omitted;

FIG. 5 shows the bottom of the object of FIG. 3 in perspective;

FIG. 6 is a lateral view of the prism shown in FIG. 1;

FIG. 7 is a view along the arrow VII of FIG. 6;

FIG. 8 shows schematically the optical effect of the prism; and

FIG. 9 is a diagram of the distribution of illumination E along a longitudinal direction X of the movement detection field.

DETAILED DESCRIPTION OF THE INVENTION

Figure 1:
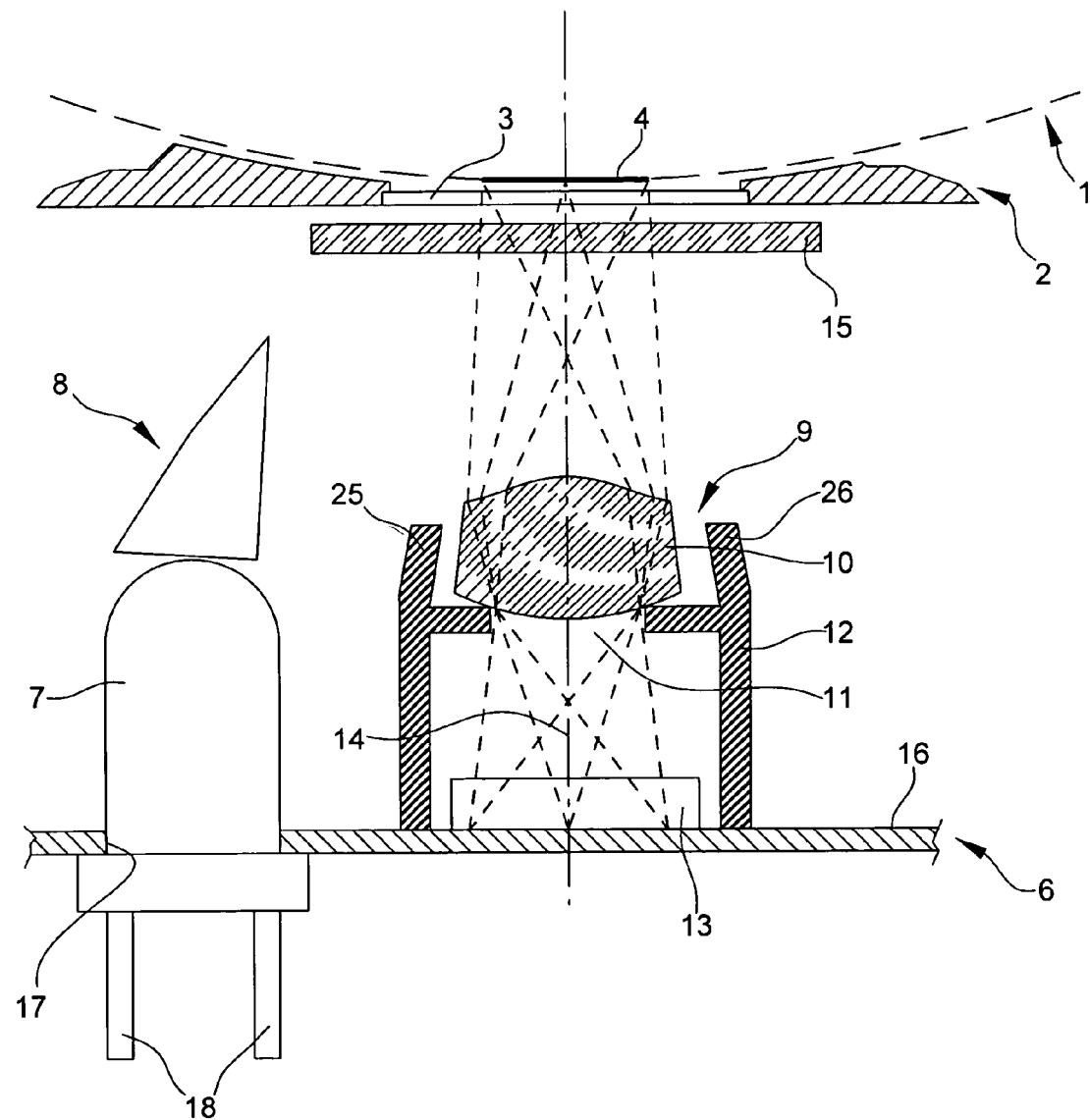
FIG. 1 is a schematic cross-section of a movement detection device according to the invention, for a computer pointing tool.

The device shown in the drawings is intended to be integrated in a trackball type rotating ball pointing device, for example of the type disclosed in U.S. Pat. No. 6,124,587, to which the reader may refer as regards the other structural and operational features of such a device. It will be noted however, that the device according to the invention may also find application in other devices, in particular ball-free computer mice, where the relative movements between the mouse and the plane surface of a table or mouse mat are detected, or a hand-held scanner of the type disclosed in U.S. Pat. No. 5,686,720.

In the example described here, the object whose movements are detected is a ball 1 whose surface bears, in a known manner, a pattern formed of lines or dots. Ball 1 can rotate in a housing 2 shown solely schematically in FIG. 1 and including a transparent window 3 behind which appears an object field 4 of the surface of ball 1. Since field 4 is small in size, with a diameter of approximately 2.8 mm, it may be considered as approximately plane. The detection device shown schematically in FIG. 1 is mounted inside housing 2. It includes a printed circuit board 6 which is fixed in housing 2 and supports the whole of the device described here, in particular a light emitting diode (LED) forming the only light source of the device, a prism 8 arranged for directing the light from LED 7 towards the object field 4, an optical system 9 formed here of a lens 10 and a diaphragm 11, a support 12 of the optical system and an optoelectronic sensor 13 formed in a known manner by an integrated circuit provided with an array of photo-sensors at its upper surface. Optical system 9 is arranged to form an image of field 4 on the array. This system arranged opposite window 3, has a rectilinear optical axis 14 perpendicular to field 4. A high quality image of field 4 is thus obtained with very simple means. A transparent protective plate 15 can be placed in front of window 3.

Printed circuit board 6 is a single face board, i.e. all the printed circuits are on its upper surface 16, which reduces the manufacturing cost of the board and the assembly of components thereon. Sensor 13 is directly mounted on face 16 of the board via the "chip-on-board" method (COB), assuring direct electric connections. LED 7 is inserted from below in a hole 17 made in board 6, which holds it firmly in a precise position. Its two connecting pins 18 are bent upwards so as to engage in two other holes of the board and be connected to the printed circuits by soldering on upper surface 16 of the board. A capacitor 19 fixed onto the lower face of board 6 is electrically connected in the same manner.

The other electrical components such as 20, 21 of the device are mounted on upper face 16 of the board. The printed circuits of board 6 are connected to other electric circuits of the apparatus by means of a flat cable 24.

The support 12 of the optical system is formed by a moulded plastic part which is snap fitted on to board 6, owing to two snugs with resilient catches 22 engaging in holes 23 of the board. This assures precise positioning of support 12, which also covers and protects sensor 13. Above diaphragm 11, support 12 includes two curved lateral walls 25 and 26 forming a screen around lens 10 to prevent it from receiving stray light. Generally, support 12 forms a housing preventing sensor 13 from receiving light originating from anywhere other than the field to be observed.

Prism 8 and lens 10 are advantageously made in the form of the same moulded transparent synthetic part 27, for example made of polycarbonate or PMMA, this part including two lateral arms 28 rigidly connecting the prism to the lens. This part 27 is snap fitted onto the upper surface 29 of support 12, which is provided with two resilient catches 30 hooking onto arms 28 to snap fit said part 27. This fixing mode and the bent at a right angle shape of arms 28 engaging between the two walls 25 and 26 of the support guarantee precise positioning of the two optical elements 8 and 10 with respect to the other components of the device. Moreover, the manufacturing cost of moulded part 27 is low and the assembly thereof is extremely simple.

The preferred embodiment and the function of prism 8 will now be described with reference to FIGS. 6 to 9. In FIG. 6, the position of the prism is shown with respect to a reference plane 32 which is parallel to printed circuit board 6 and to the plane of object field 4. All the external surfaces of the prism are plane. The entry face 33 of the prism is inclined by approximately 3.47° with respect to plane 32. The exit face 23 is inclined by approximately 86.7° with respect to this plane. The third face 35 is a reflection face including two plane surfaces 36 and 37 which are connected along an edge 38 forming a relatively small angle between them, in this housing approximately 6.5°. In the example shown, the inclination of surface 36 with respect to plane 32 is approximately 57.26° and that of surface 37 is approximately 50.71°. The lateral faces 39 of the prism are parallel in the present housing, but they could also be slightly convergent towards the top in order to direct the light, which undergoes total reflection on these faces.

As FIG. 8 shows schematically, a light beam 40 originating from LED 7 enters the prism via lower face 33 of the latter and undergoes total reflection over reflection face 35 of the prism. The two plane surfaces 36 and 37 of this face, having different inclinations, divide beam 40 into to partial beams 41 and 42 one of which is drawn in a dotted line and the other in a continuous line. After refraction over the exit face 34 of prism 8, the two beams go across object field 4 to illuminate it.

The diagram of FIG. 9 shows the distribution of illumination E thereby obtained over object field 4, as a function of the abscissa in the longitudinal direction X of field 4. Curve 43 shows schematically the illumination produced by beam 41, and curve 44 that produced by beam 42. Curve 45, representing the total illumination produced by the two beams, shows an excellent uniformity of illumination over the length of field 4. This assures a very good response of the photo-sensor array of sensor 13 and allows simple processing of the photo-sensor output signals.

It should be noted that good uniformity of illumination of field 4 could also be obtained if reflection face 35 of prism 8 had a convex shape or facets.

The preceding description shows that the present invention enables a simple and robust detection device to be obtained, which can be mass produced at a low cost while offering high performance. Moreover, if one of the components of the device has to be modified in a mass production, this can occur without any difficulty, since the necessary modifications can be made simply to the printed circuit board or, if required, to support 12 or optical part 27, without changing the other elements of the device.

The invention claimed is:

1. A device for detecting movements of a surface of an object, in particular for a computer pointing device, including a light source, guide means for directing light coming from said source obliquely onto a field of said surface, an optoelectronic sensor provided with an array of photosensors, and an optical system to form an image of said field on said optoelectronic sensor, wherein said guide means includes a prism having a reflection face, on which said light coming from said source undergoes total reflection, said face having a shape that is not uniformly plane and is arranged to concentrate in a uniform distribution said light over said field.

2. The device of claim 1, wherein said reflection face of said prism includes two plane surfaces forming an angle between them.

3. The device of claim 1, wherein all the surfaces of said prism are plane.

4. The device of claim 1, wherein said reflection face of said prism is convex towards the exterior of said prism.

5. The device of claim 1, further including a printed circuit board on which said light source and said optoelectronic sensor are mounted.

6. The device of claim 5, wherein said optical system is mounted on a support, which is fixed to said printed circuit board.

7. The device of claim 6, wherein said prism is mounted on said support of said optical system.

8. The device of claim 7, wherein a lens of said optical system and said prism are formed of a single moulded part mounted on said support of said optical system.

9. The device of claim 6, wherein said support of said optical system includes a wall forming a screen between said prism and said optical system.

10. The device of claim 1, wherein said reflection face, having the shape that is not uniformly plane, is the only prism face on which said light coming from said source undergoes said total reflection.

* * * * *